(12) United States Patent
Hasegawa

(10) Patent No.: US 11,493,994 B2
(45) Date of Patent: Nov. 8, 2022

(54) INPUT DEVICE USING BIOELECTRIC POTENTIAL

(71) Applicant: NATIONAL INSTITUTE OF ADVANCED INDUSTRIAL SCIENCE AND TECHNOLOGY, Tokyo (JP)

(72) Inventor: Ryohei Hasegawa, Ibaraki (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 0 days.

(21) Appl. No.: 17/258,925

(22) PCT Filed: Jul. 12, 2019

(86) PCT No.: PCT/JP2019/027675
§ 371 (c)(1),
(2) Date: Jan. 8, 2021

(87) PCT Pub. No.: WO2020/017448
PCT Pub. Date: Jan. 23, 2020

(65) Prior Publication Data
US 2021/0325966 A1 Oct. 21, 2021

(30) Foreign Application Priority Data
Jul. 20, 2018 (JP) .............................. JP2018-136723

(51) Int. Cl.
*G06F 3/01* (2006.01)
(52) U.S. Cl.
CPC .............. *G06F 3/015* (2013.01); *G06F 3/012* (2013.01)
(58) Field of Classification Search
CPC .......... G06F 3/015; G06F 3/012; G06F 3/013; G06F 3/0346
See application file for complete search history.

(56) References Cited

U.S. PATENT DOCUMENTS

| 4,561,448 A | * | 12/1985 | Buchas | ................ A61B 5/2415 |
| | | | | 600/546 |
| 8,405,610 B1 | * | 3/2013 | Cole | ....................... G06F 3/013 |
| | | | | 345/158 |

(Continued)

FOREIGN PATENT DOCUMENTS

| JP | 7-241283 A | 9/1995 |
| JP | 2010-231290 A | 10/2010 |

(Continued)

OTHER PUBLICATIONS

Chiba, Shuhei, et al., "Development of EOG-Based Character Input Interface Controlled by Three-Directional Eye Movements", The Institute of Electronics, Information and Communication Engineers, IEICE Technical Report, May 14, 2010, vol. 110, No. 53, pp. 39-44.

(Continued)

*Primary Examiner* — Mihir K Rayan
(74) *Attorney, Agent, or Firm* — Hoffmann & Baron, LLP

(57) ABSTRACT

An input device, method, and system enabling a switch input operation of various equipment by moving a body part other than hands and feet. Input by body movement, such as a wink, is achieved by an input device including: a detector which includes a first contact electrode placed at a first position of a body part and a second contact electrode placed at a second position of the body part, the detector configured to measure a biological signal between the first contact electrode and the second contact electrode, and to detect a low-frequency component inclusive of the biological signal; and a discrimination processor configured to determine, based on a signal from the detector, presence or absence of an input movement of the body part in a vicinity of the first position, and/or presence or absence of an input movement of the body part in a vicinity of the second position.

12 Claims, 7 Drawing Sheets

(56) References Cited

U.S. PATENT DOCUMENTS

| 9,841,812 | B2* | 12/2017 | Kitazawa | A61B 5/6814 |
| 2016/0007849 | A1* | 1/2016 | Krueger | A61B 5/11 |
| | | | | 600/301 |
| 2016/0203359 | A1* | 7/2016 | von und zu Liechtenstein | ........... |
| | | | | G06V 40/19 |
| | | | | 345/156 |
| 2017/0006931 | A1* | 1/2017 | Guez | A61B 5/369 |
| 2017/0220109 | A1 | 8/2017 | Liu | |
| 2018/0146923 | A1* | 5/2018 | Fridman | A61B 5/398 |

FOREIGN PATENT DOCUMENTS

| JP | 2011-183073 A | 9/2011 |
| JP | 2012-55587 A | 3/2012 |
| JP | 2012-150837 A | 8/2012 |
| JP | 2015-213734 A | 12/2015 |
| JP | 2017-157139 A | 9/2017 |

OTHER PUBLICATIONS

Sasaki, Hiroki, et al., "Improvement of Input Device using DC-Coupled Electrooculogram for Communication Support", The Institute of Electronics, Information and Communication Engineers, IEICE Technical Report, Nov. 9, 2012, vol. 112, No. 297, pp. 31-36.

* cited by examiner

INPUT DEVICE USING BIOELECTRIC POTENTIAL

CROSS-REFERENCE TO RELATED APPLICATIONS

The present application is the U.S. National Phase of PCT/JP2019/027675, filed on Jul. 12, 2019, which claims priority to Japanese Patent Application No. 2018-136723, filed on Jul. 20, 2018, the entire contents of which are incorporated herein by reference.

BACKGROUND

Technical Field

The present invention relates to an input device, an input method, and an input system which make it possible for an operator to operate equipment using a movement of a body part of the operator, such as blinking, without using the operator's hand or foot.

Related Art

In recent years, in the fields of information science, medical engineering applications, welfare equipment control, games, and the like, equipment is mainly operated by a manual input operation using various switches, joysticks, mouse, and the like. Further, in the aforementioned fields, equipment that can be operated without using hands or feet is desirable for an operator who has difficulty using his or her hands or legs, or for an able-bodied person.

The inventor, focusing on the motion of the head, has proposed an input device (Patent Literature 1) which detects a joystick-like motion of the head of the operator using a detection means attached to the user's head, and which operates and controls equipment on the basis of a detected signal.

A prior art document search conducted by the inventor has turned up the following documents (Patent Literatures 2 and 3). Patent Literature 2 relates to a game device, and indicates that a bioelectric signal of a predetermined frequency component (around 50 Hz) due to an eyeball movement or blinking is detected, and that the states of the operator (panicky, concentrated, winking in the right eye) are determined based on the bioelectric signal.

Patent Literature 3 relates to a device, such as eyeglasses, for appropriately detecting eye blinking, and discloses eyeglasses with two electrodes at the left and right nose pads, and an electrode at the center between the eyebrows. The document indicates that, upon detecting an increase in the number of times of eye blinking of a user from electro-oculogram signals that have been measured, for example, a warning is emitted to prevent dozing-off.

CITATION LIST

Patent Literature

Patent Literature 1: JP 2010-231290 A
Patent Literature 2: JP 2011-183073 A
Patent Literature 3: JP 2015-213734 A

SUMMARY

Technical Problem

When language or the hands or feet were not available, mankind has used other body parts to send signs. Examples of the signs include the movement of closing and then opening an eye consciously, i.e., a wink movement, and the movement of closing and then opening both eyes consciously, i.e., a blink movement.

In order to detect the movement of an eyeball or eyelids, a technique of detecting an eye potential is known. Generally, the eyeball has a positive charge on the cornea side, and a negative charge on the retina side, so that a potential difference is generated between them. The potential difference is called the eye potential. The eye potential is a potential difference on the order of several tens of millivolts. When the potential difference is measured by attaching electrodes onto the skins above and below the eye, the potential difference changes due to the movement of the eye or blinking.

FIG. 7 illustrates a general eye potential measurement technique. With a pair of electrodes (Ch.1(−), Ch.1(+)) placed on the outside of both eyes, it is possible to detect eyeball positions in the horizontal direction. With a pair of electrodes (Ch.2(+), Ch.2(−)) placed at portions over the eyebrow of one eye and on the cheek under the eye, it is possible to detect eyeball positions in the vertical direction. The figure illustrates the detection only for the right eyeball, and illustration of the detection for the left eyeball is omitted. The measuring technique is said to enable not only the detection of horizontal and vertical eyeball motions associated with the movement of the line of sight during a visual search or the like, but also the measurement of the eye potential reflecting an instantaneous supraduction motion of both eyes accompanying eye blinking.

Generally, blinking includes periodic blinking which is performed unconsciously, reflective blinking which is performed when light is shone on the eye, and blinking (a wink, a blink) which is performed consciously (or voluntarily).

Thus, the bodily biological signals include those based on an unconscious motion and a conscious motion, and it has been difficult to accurately distinguish these motions and to determine an input content accurately from a biological signal produced by a conscious motion. For example, it has been difficult to distinguish voluntary blinking of both eyes from natural blinking (of both eyes) for moistening the eyes, potentially causing an erroneous operation.

Conventionally, there has been a demand for a device capable of detecting a body part movement and thus replacing the input operation means using hands or feet. However, a device which is capable of instantaneously and accurately detecting and determining the movement and that can be easily attached has not been achieved.

The present invention aims to solve the problems, and an object of the present invention is to provide an input device, an input method, and an input system with which it is possible to instantaneously and accurately detect and determine a movement, such as a wink, that disrupts the left-right symmetry of a body part, or a similar body movement.

Solution to Problem

The present invention has the following features to achieve the object.

(1) An input device including: a first contact electrode placed at a first position of a body part; a second contact electrode placed at a second position of the body part; a detector configured to measure a biological signal between the first contact electrode and the second contact electrode, the detector further configured to detect a low-frequency component inclusive of the biological signal, the low-frequency component having a range of 1 Hz to 30 Hz; and a discrimination processor configured to determine, based on a signal from the detector, presence or absence of an input movement of the body part in a vicinity of the first position, and/or presence or absence of an input movement of the body part in a vicinity of the second position.

(2) The input device according to (1), further including a transmitter configured to transmit a signal from the discrimination processor as an input operation signal.

(3) The input device according to (1), further including a sensor integral with the detector, the sensor configured to detect movements including up-down and left-right motions of a head.

(4) The input device according to (2), further including a sensor integral with the detector, the sensor configured to detect movements including up-down and left-right motions of a head.

(5) An input method including: measuring a biological signal between a first contact electrode placed at a first position of a body part and a second contact electrode placed at a second position of the body part, and detecting a low-frequency component inclusive of the biological signal, the low-frequency component having a range of 1 Hz to 30 Hz; and determining, based on a signal obtained from the detecting, presence or absence of an input movement of the body part in a vicinity of the first position, and/or presence or absence of an input movement of the body part in a vicinity of the second position.

(6) The input method according to (5), further including transmitting a signal obtained from the determining as an input operation signal.

(7) The input method according to (5), further including detecting a head movement combining a motion of tilting a head left and right or swinging a neck left and right along a first axis, with a motion of tilting the head forward and backward along a second axis, wherein an input operation signal based on the detecting of the head movement is transmitted.

(8) The input method according to (6), further including detecting a head movement combining a motion of tilting a head left and right or swinging a neck left and right along a first axis, with a motion of tilting the head forward and backward along a second axis, wherein the input operation signal based on the detecting of the head movement is transmitted.

(9) The input method according to (5), wherein the input movement of the body part in the vicinity of the first position and the input movement of the body part in the vicinity of the second position are left-right asymmetric movements of a left-right symmetric body part.

(10) The input method according to (5), wherein the input movement of the body part in the vicinity of the first position is a wink of a left eye, and the input movement of the body part in the vicinity of the second position is a wink of a right eye.

(11) An input system including: a detection means including a first contact electrode placed at a first position of a body part, and a second contact electrode placed at a second position of the body part, the detection means for measuring a biological signal between the first contact electrode and the second contact electrode and for detecting a low-frequency component inclusive of the biological signal, the low-frequency component having a range of 1 Hz to 30 Hz; and a discrimination process means for determining, based on a signal obtained by the detection means, presence or absence of an input movement of the body part in a vicinity of the first position, and/or presence or absence of an input movement of the body part in a vicinity of the second position.

(12) The input system according to (11), further including a transmitting means for transmitting a signal obtained by the discrimination process means as an input operation signal.

(13) The input system according to (11), further including a sensing means integral with the detection means, the sensing means for detecting movements including up-down and left-right motions of a head.

Advantageous Effects of Invention

According to an input device, an input method, and an input system of the present invention, instead of an input device using hands or feet, it is possible to detect the presence or absence of a left or right movement, such as a wink, and to make a discrimination of the movement accurately and at high speed. Thus, the present invention can be effectively utilized by an operator having difficulty in hands or feet, or an operator who wishes to use his or her hands or feet for other purposes, i.e., for hands-free input operations or the like.

According to an input device, an input method, and an input system of the present invention, it is possible to perform multiple switch operations corresponding to two types of button switches relating to, for example, the presence or absence of a right wink and the presence or absence of a left wink, using only the two terminals of the first electrode and the second electrode, i.e., by simply detecting only one channel.

According to an input device, an input method, and an input system of the present invention, the head may be assumed to be a joystick (the top of the head corresponding to the tip direction), and a sensor, such as a gravitational acceleration sensor, for detecting movements of tilting the head forward and backward or left and right can be added, whereby input operations equivalent to the pointing/moving operations of the conventional mouse can be added. Accordingly, input operations with the conventional mouse click function and pointing/moving function can be performed. Further, instead of tilting the head left and right, movements of swinging the neck left and right may be detected using a geomagnetic sensor or a gyro sensor, and may be combined with the forward/backward tilting of the head, whereby it also becomes possible to add input operations provided with the pointing/moving function of the mouse. In this case, too, the head may be assumed to be a joystick (the back of the head corresponding to the tip direction). Even when a joystick is assumed in the same directions, a laser pointer operating in conjunction with a personal computer may be placed in an appropriate position on the head, whereby the screen position pointed by the laser can be changed by left/right neck swings and forward/backward tilting of the head.

According to an input device, an input method, and an input system of the present invention, it is possible to operate a personal computer or to control mobile objects (such as an electric wheelchair, a drone, a cleaning robot, and a self-driving vehicle) without moving a mouse or pressing left and right buttons thereof.

DETAILED DESCRIPTION

Embodiments of the present invention will be described below.

The present invention provides an increase in the accuracy and speed of detection and determination of a biological signal, such as an asymmetric biological signal of a symmetric part of a body part, as represented by an eye potential reflecting a wink. The present invention may be utilized by persons having difficulty in a body part, such as a hand or foot, as well as by any able-bodied person who requires a hands-free interface.

According to the present invention, interface techniques are provided that enable "pressing" of two kinds of switches (for example, left and right mouse buttons) using time-series data of difference potentials with respect to bioelectric potentials reflecting a pair of left-right asymmetric (left on/off, right on/off) body movements, such as a wink. The device of the present invention is applicable not only in the case of an asymmetric movement of a left-right symmetric part, but also in the case of body parts that are not symmetric, as long as the body parts are such that potential difference signals having different polarities due to a movement of the body parts can be detected by the device of the present invention.

According to the present invention, with respect to an input movement of a body part in the vicinity of first and second positions where electrodes are placed, when the "first and second positions" are above the eyebrow of one eye, an "input movement" of a "body part in a vicinity of a first or second position" corresponds to a "wink" of "one eye". Further, when "first and second positions" are on the cheeks of a face, an "input movement" of a "body part in a vicinity of a first or second position" corresponds to a "rise" of "one corner of the mouth". Further, when "first and second positions" are left and right ends of an eye or an area above an eyebrow on the face, an "input movement" of a "body part in a vicinity of a first or second position" corresponds to a "rise" of "one end of the eye or eyebrow". The "periphery" generally refers to the order of 0.5 mm to 4 cm inclusive.

According to an embodiment, a discrimination processor determines the presence or absence of an input movement of a body part in a vicinity of a first position on the basis of a signal from a detector, and/or the presence or absence of an input movement of the body part in a vicinity of a second position. For example, the discrimination processor performs a discrimination process concerning the presence or absence of a wink of the right eye and the presence or absence of a wink of the left eye.

First Embodiment

Figure 1:
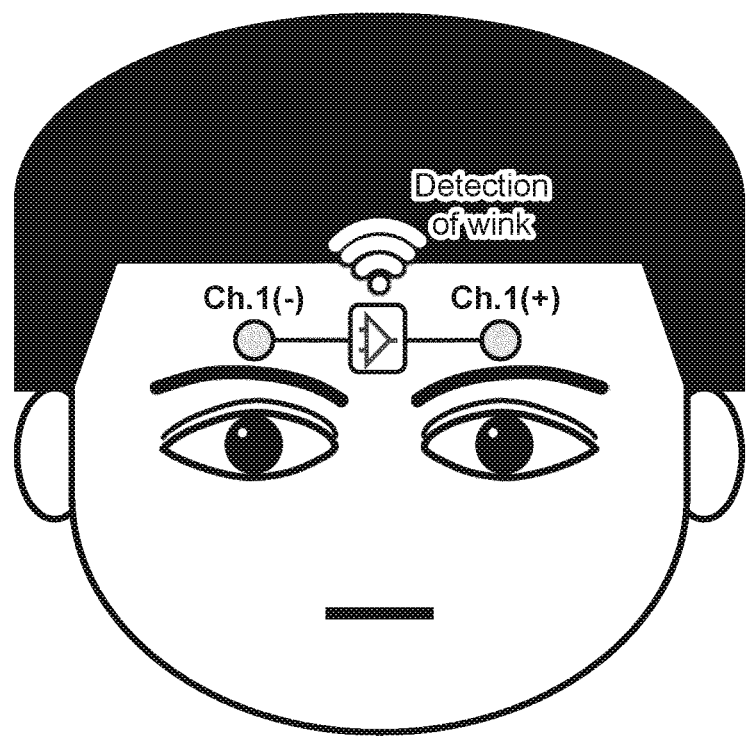
FIG. 1 illustrates eye potential measurement according to a first embodiment of the present invention.

The present embodiment relates to an input device and an input method, for example, involving an eye potential measurement. The present embodiment is described with reference to FIG. 1, FIGS. 2A and 2B, and FIGS. 3A-3D in detail below. FIG. 1 illustrates a pair of electrodes respectively disposed above the left and right eyes (in the figure, above the eyebrows). The input device of the present embodiment includes at least: a first electrode disposed above one eye; a second electrode disposed above the other eye; a sensor unit including a meter for measuring a potential difference between the first electrode and the second electrode, and a transmitter for transmitting the result of measurement; and an electric wire connecting the sensor unit and the electrodes. The sensor unit is preferably provided with a detector for only detecting, with respect to the signal of the result of measurement of the potential difference, a predetermined low-frequency component, and a discrimination unit for determining, based on a signal from the detector, the presence or absence of a left/right eye movement, such as a wink. When the low-frequency component detector and the discrimination unit are not provided in the sensor unit itself, a personal computer or information equipment as a transmission destination may be provided with the corresponding functions. The transmitter may include wired or wireless means.

In the present embodiment, the electrodes are only placed above the left and right eyes to measure the potential difference, and it is not necessary to place electrodes below the left and right eyes. Only one electrode is disposed for one eye. Although a pair of electrodes may be disposed only below the left and right eyes, this may likely result in a poor wearing feel, and hence the location above the eyebrows is preferable. In the present embodiment, an input operation by a wink is enabled. In order to minimize the shape of the device, it is preferable to place a small sensor unit, such as a wireless electrooculography meter, at the center of the forehead, as illustrated. In this way, the need for cables or structures that would block the field of view can be eliminated.

Figure 2A:
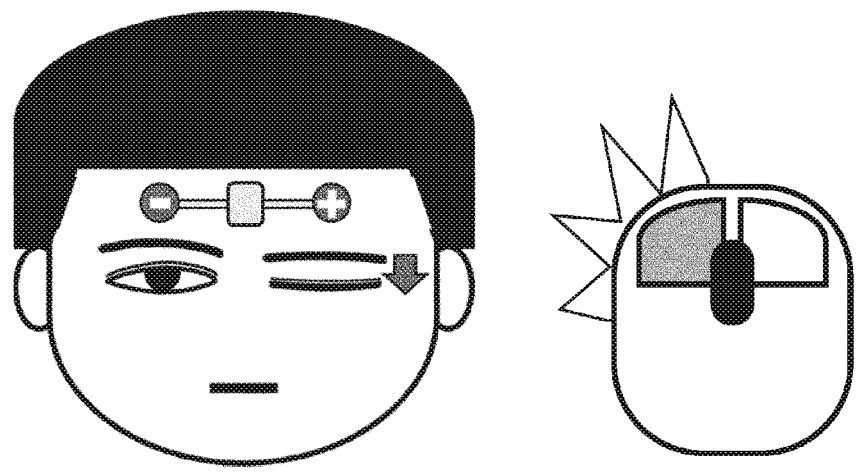
FIGS. 2A and 2B illustrate left and right winks in correspondence with a mouse click function according to the first embodiment.
Figure 2B:
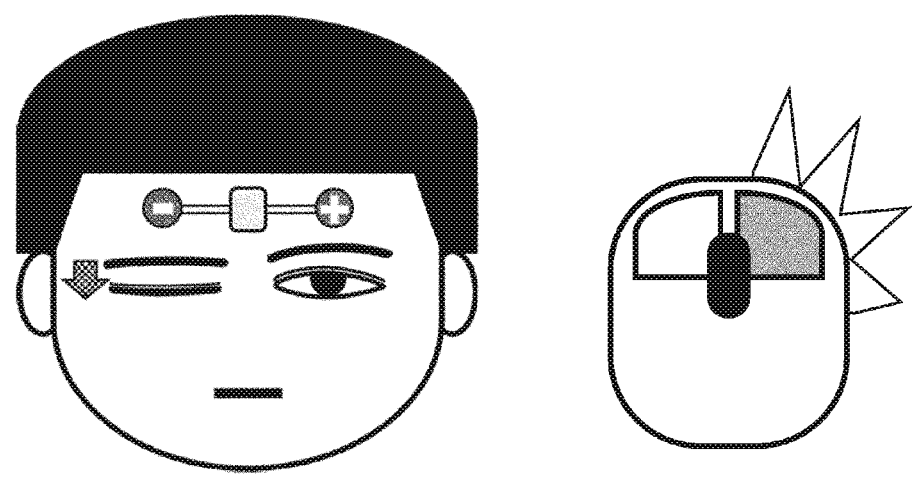

FIGS. 2A and 2B illustrate respectively left and right winks in correspondence with a mouse click function according to the present embodiment. As illustrated in FIG. 2A, when the left eye winks, an input signal corresponding to the operation of pressing a left mouse clicking switch is transmitted. When the right eye winks, as illustrated in FIG. 2B, an input signal corresponding to the operation of pressing a right mouse clicking switch is transmitted. With the correspondence, the left and right winks can be associated with the two switch operations. The input device of the present embodiment is based on a wink movement, and may therefore be referred to as a wink movement-sensing input device.

Figure 7:
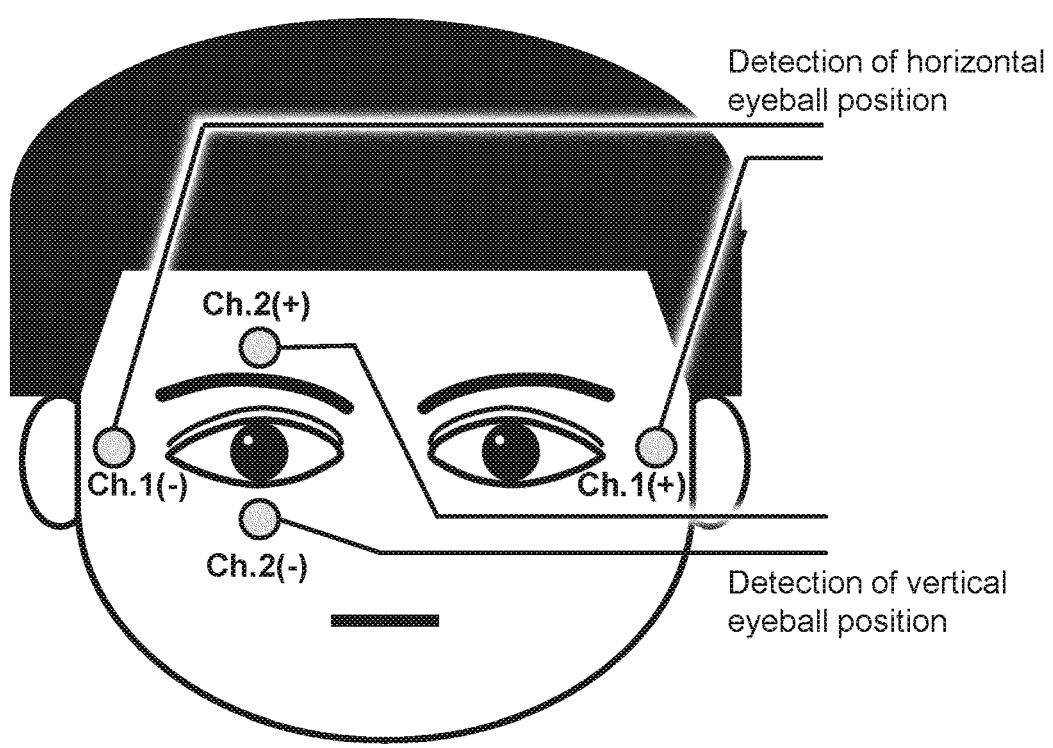
FIG. 7 illustrates a conventional eye potential measurement technique.

FIGS. 3A-3D illustrate the basic principle for replacing the left and right mouse click functions with left and right winks. Each of the FIGS. 3A, 3B, 3C, and 3D shows, in order from the leftmost-side column: "right eye potential"; "left eye potential"; "left-right difference"; and "similar function". Under each of "right eye potential" and "left eye potential", the open/close state of the eye is schematically illustrated. The "right eye potential" and "left eye potential" are eye potentials obtained on the premise that the eyes are measured one at a time, as according to the conventional technique illustrated in FIG. 7. The "right eye potential" schematically illustrates the result of measuring the eye potential of the right eye as illustrated in FIG. 7. The "left eye potential" similarly illustrates the result of measuring the eye potential of the left eye as illustrated in FIG. 7.

The "left-right difference" schematically illustrates, for purposes of explanation, the results of eye potential measurement of FIG. 1 according to the present embodiment. In reality, the measurement result signal includes various noises and high frequency components. Accordingly, determination is only possible after a low-frequency component detecting step and a discrimination process step are performed as in the present embodiment. It will be understood that the eye potential measurement results of the present embodiment show tendencies common to the results of obtaining differences between the "left eye potential" and the "right eye potential" according to the eye potential measurement of each eye by the conventional technique.

The "similar function" schematically illustrates corresponding mouse click functions.

Figure 3A:
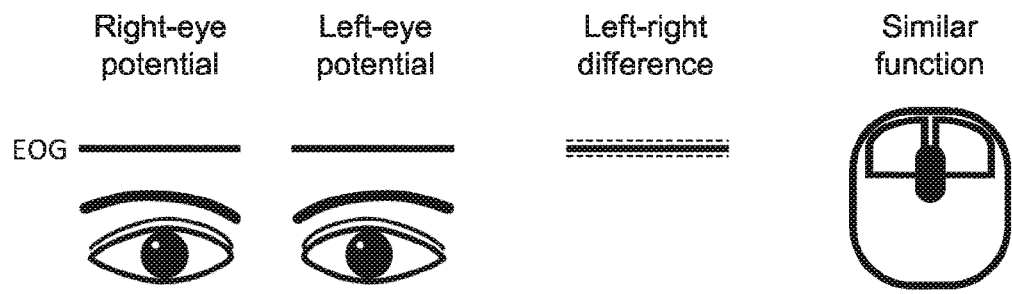
FIGS. 3A-3D illustrate the basic principle for replacing the left and right mouse click functions with left and right winks according to the first embodiment.

FIG. 3A illustrates the case in which both eyes are maintaining an open-eye state, where there is no change in the electro-oculogram with respect to each eye, and there is also no change in the potential of the "left-right difference". The "similar function" corresponds to the left and right mouse click functions being turned off.

Figure 3B:
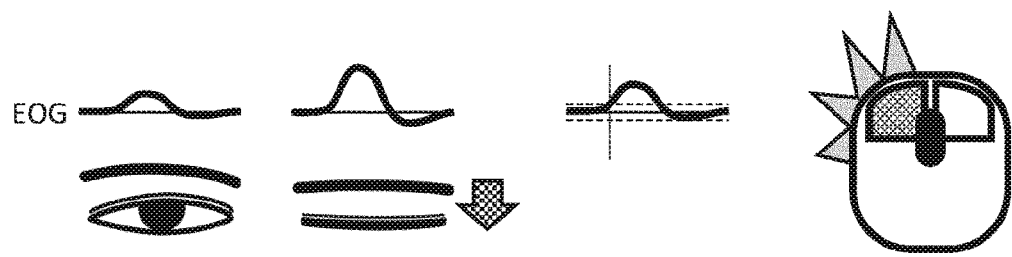

FIG. 3B illustrates the case in which the left eye has winked, where a strong reaction is observed with respect to the blinking of the left eye, but the right eye is limited to a weak reaction with respect to blinking. This is because, while ideally the right eye should stay open, slight supraduction (upward movement of the iris) of the right eye also occurs, reflecting the tendency of the right eye to close somewhat due to the wink of the other eye. Thus, when the right eye potential is subtracted from the left eye potential, a positive potential change is produced. The "similar function" corresponds to the left mouse click function being turned on.

Figure 3C:
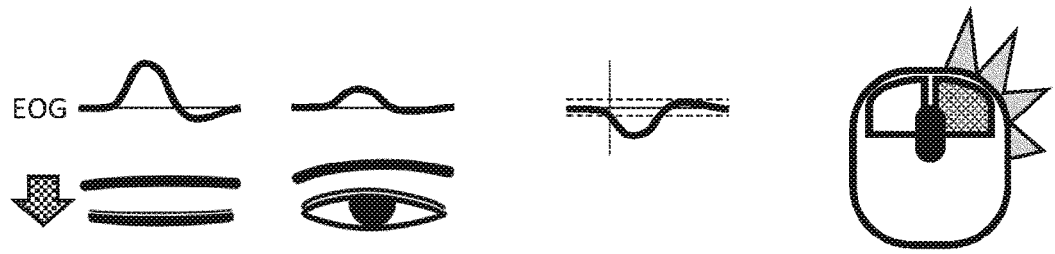

FIG. 3C illustrates the case in which the right eye has winked, resulting in a phenomenon opposite to FIG. 3B. When the right eye potential is subtracted from the left eye potential, a negative potential change is produced. The "similar function" corresponds the right mouse click function being turned on.

Figure 3D:
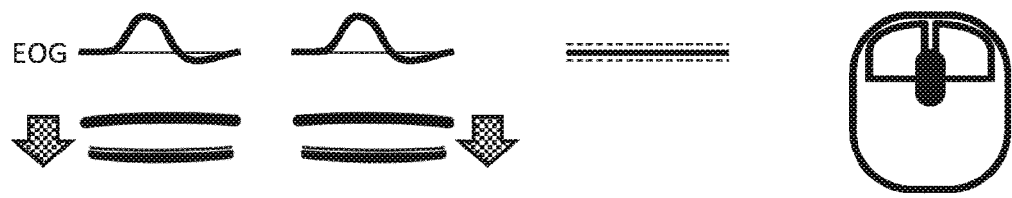

FIG. 3D illustrates the case in which both eyes have blinked, as when moistening the eyes. In this case, an eye potential is produced in each of the left and right eyes reflecting an instantaneous supraduction. However, the same potentials arise at the same timing, so that the potentials cancel each other out in terms of difference, and no signal is produced. The "similar function" corresponds to the left and right mouse click functions being turned off.

As discussed with respect to FIGS. 3A, 3B, 3C, and 3D, it will be understood that it is only in the case of the left and right winks that left-right difference potentials are produced, where the polarities of the potentials are different. Accordingly, the left and right winks can be associated with two types of switch functions (for example, a left click and a right click of the mouse). Using the corresponding relationship, it is possible to control two types of switches.

Next, the detector which, with respect to the signal of the result of potential difference measurement, only detects a predetermined low-frequency component will be described. The signal of potential difference between the first electrode and the second electrode includes high frequency components of the eye potential signals and also various other noises. Thus, it is impossible to determine the presence or absence of a wink directly from a signal obtained from a living body. Accordingly, in the present embodiment, the signals extracted from a pair of electrodes are filtered, for example, to extract only a predetermined low-frequency component. Preferably, a low-frequency component of 1 Hz to 30 Hz inclusive is detected. Alternatively, a low-frequency component of 1 Hz to 20 Hz inclusive may be detected.

Next, signal processing performed by the discrimination unit for determining the presence or absence of an eye movement, such as left and right winks, will be described.

A simplest algorithm involves a method including providing a certain threshold value with respect to each of positive and negative potentials, and determining that the relevant one of switches is on when the threshold value is exceeded. For example, when a positive potential exceeding the positive threshold value has been determined, a first switch is turned on, and when a negative potential exceeding the negative threshold value has been determined, a second switch is turned on.

Further, a determination method involving pattern recognition with respect to a positive or negative waveform pattern that has exceeded each of the positive or negative threshold values within one second each before and after a peak time may be used. With this determination method, it becomes possible to provide a switch output with robust noise immunity with respect to the noise of peripheral electric equipment and the noise due to bioelectric potentials other than those due to blinking. More specifically, it is preferable to provide a calibration time in advance to acquire sufficient potential data associated with left and right winks, and to have the waveform patterns of the left and right winks at the time stored as molds (so called learning data). Based on the waveform patterns of the learning data, a correlation coefficient of potential data of a new measurement result may be determined, or a discriminant score for linear discriminant analysis may be referenced, whereby it becomes possible to determine which of two types of switches, such as the left and right clicks of a mouse, is to be turned on.

When a wink can be used as a signal, as in the present embodiment, it is possible to activate two types of switches depending on whether a left wink or a right wink is performed, without an erroneous operation that may happen according to the conventional technique depending on the blinking of both eyes (blink).

When the discrimination process is performed by the pattern recognition method, different potential patterns can be generated even for the same left eye or right eye by performing a wink twice successively and performing a slow wink once, for example. Accordingly, it is possible to selectively use additional two types of switches for each of left and right (for a total of six types). These may correspond to a double-click and a long-press of the left and right buttons of the mouse.

Second Embodiment

The present embodiment relates to an input device and an input method, for example, based on the measurement of a facial conscious movement other than the eye potential measurement. The first embodiment has been described with reference to a multiple-switch technique using the bioelectric potentials reflecting a pair of left-right asymmetric body movements, such as winks by way of example. However, depending on the location where the pair of switches used by the present invention are placed, it is also possible to detect a conscious movement other than blinking and to perform a similar discrimination process, whereby the function of an input device can be provided. Examples are described below with reference to FIGS. 4A and 4B.

Figure 4A:
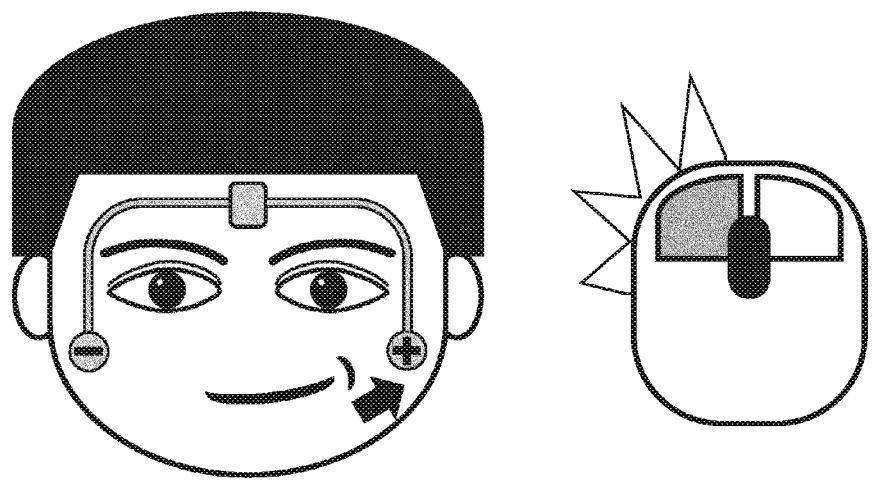
FIGS. 4A and 4B illustrate biological signals due to asymmetric movements of symmetric parts of a body part, in correspondence with the mouse click function according to the second embodiment.
Figure 4B:
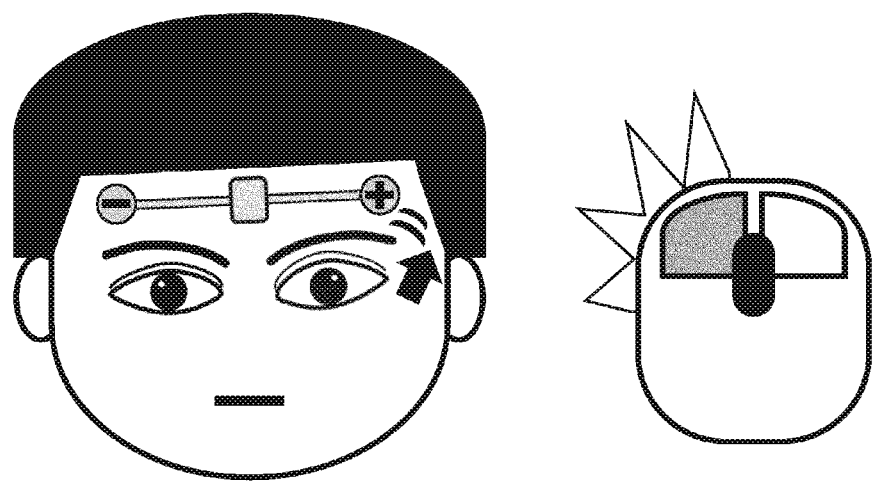

FIGS. 4A and 4B illustrate examples in which the motion of facial muscles of expression is detected and determined. As illustrated in FIG. 4A, a mouth movement, such as that of a smile, is performed only on one of the left and right sides, and the movement is detected using a pair of electrodes, to obtain a signal of a left-right difference in the potential pattern of a low-frequency component of muscle activity. Further, as illustrated in FIG. 4B, a motion to raise only one of the left and right eyes or eyebrows is performed on only one of the left and right sides, and the motion is detected using a pair of electrodes to obtain a signal of a left-right difference in the potential pattern of a low-frequency component of muscle activity. As illustrated in FIGS. 4A and 4B, it is possible to detect a signal of the left-right difference in the potential pattern of muscle activity reflecting the facial movement, and to then perform a discrimination process to perform multiple switch operations, as in the case of a wink.

Other than the facial movements described above, it is also possible to place a pair of electrodes under the left and right parts of the jaw (neck part), and to obtain from the electrodes muscle potentials reflecting a motion of the tongue toward either left or right, and detect a signal of a left-right difference in the potential pattern of the muscle activity (particularly low-frequency variations).

Third Embodiment

The first and the second embodiments have been described with reference to input methods based on asymmetric movements of left-right symmetric parts. The present embodiment, however, relates to cases in which an input device and an input method of the present invention are applied to body parts other than left-right symmetric parts. For example, the potential patterns of a low-frequency component of muscle activity reflecting movements of the wrist when executing dorsal flexion (motion of bending toward the back of the hand) or palmar flexion (motion of bending toward the palm) can be detected by the first electrode and the second electrode respectively placed in the superficial flexor muscle of fingers and on the skin surface of the superficial flexor muscle of fingers, whereby similar switch operations can be performed.

Fourth Embodiment

The present embodiment relates to an input method which is a combination of one or more of the input methods described with reference to the first to third embodiments, and movements where the head is assumed to be a giant joystick and tilted left and right or forward and backward, or the neck is swung left and right. The present embodiment further includes a step for detecting head movements where the motion of tilting the head left and right, or the motion of swinging the neck to left and right along a first axis (the X-axis) is combined with the motion of tilting the head forward and backward along a second axis (the Y-axis).

Figure 5A:
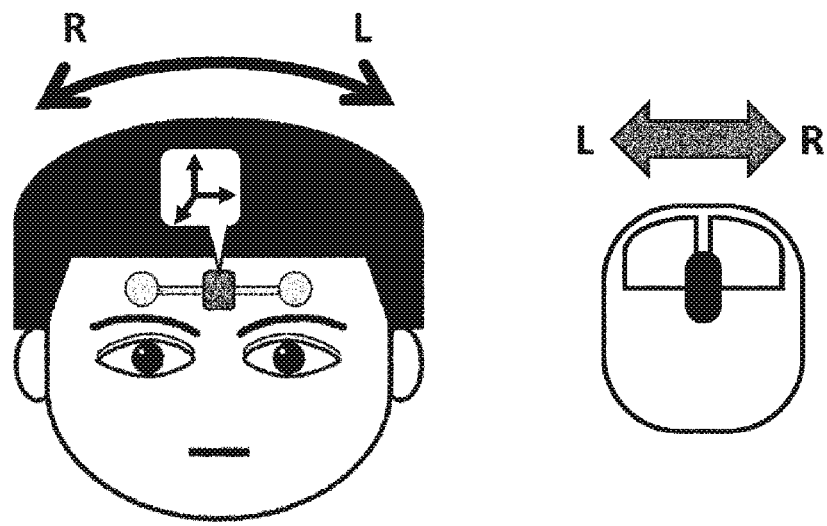
FIGS. 5A and 5B illustrate input operations by left-right and forward-backward movements of the head according to a fourth embodiment.
Figure 5B:
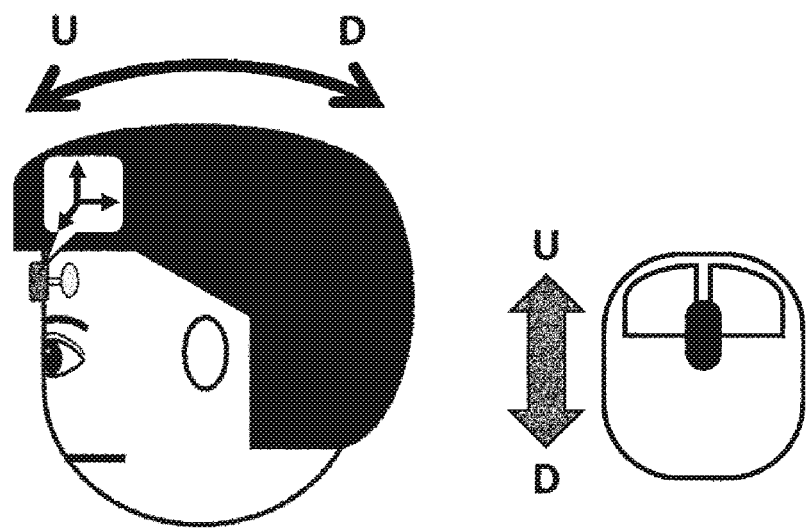

FIGS. 5A and 5B schematically illustrate an example in which the sensor unit of the first embodiment (see FIG. 1) further incorporates a gravitational acceleration sensor or the like for detecting movements of the head being tilted forward and backward or left and right. FIG. 5A illustrates the case in which the motion of the head tilted left and right is detected. When the head is consciously tilted left and right, the sensor unit detects the motion with the gravitational acceleration sensor or the like, and transmits a signal equivalent to the operation of moving a mouse left and right. FIG. 5B illustrates the case in which the motion of the head tilted forward and backward is detected. When the head is consciously tilted forward or backward, the sensor unit detects the motion with the acceleration sensor or the like, and transmits a signal equivalent to the operation of moving a mouse up and down. The user, while performing a plurality of types of switch operations by winking, for example, can perform an input operation by moving the head left and right or forward and backward.

Figure 6:
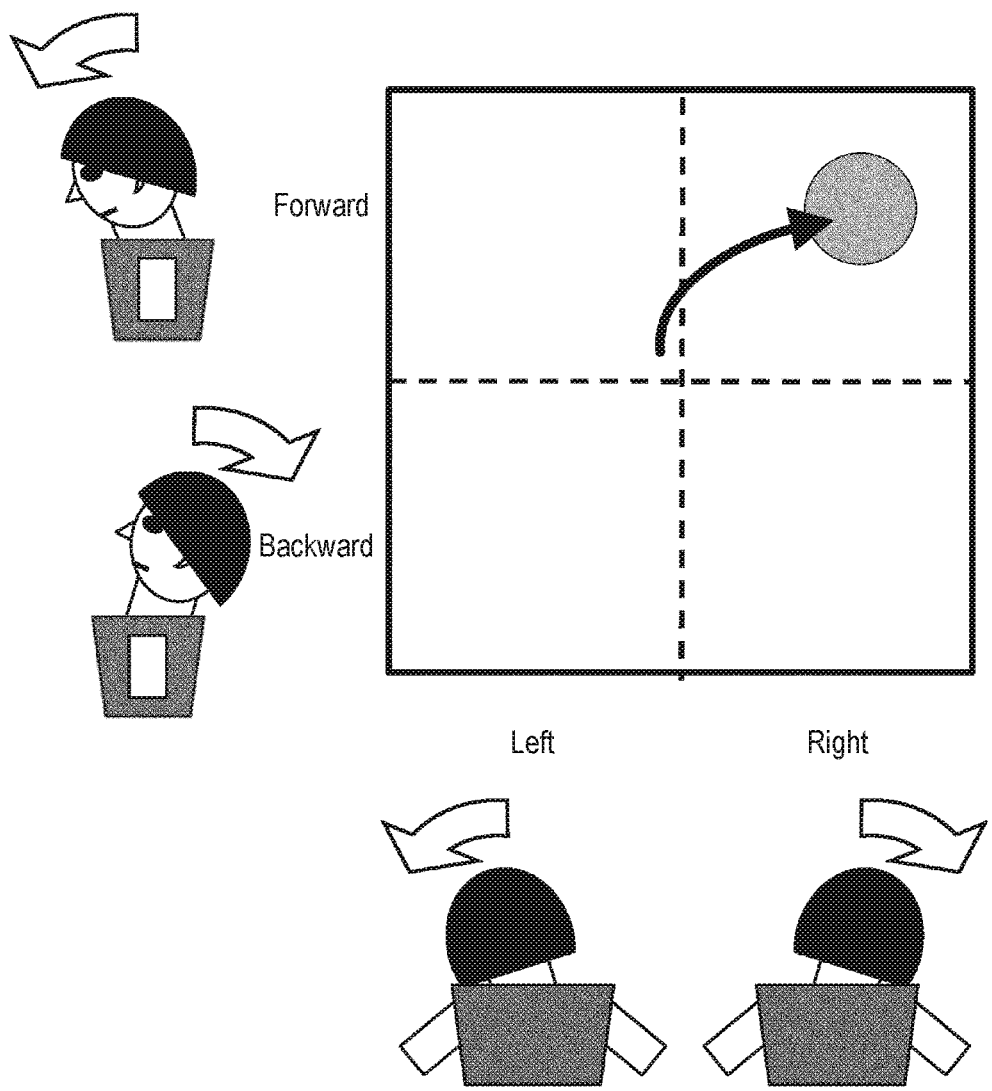
FIG. 6 illustrates a joystick function due to and in correspondence with movements of the head according to the fourth embodiment.

FIG. 6 schematically illustrates an example in which the sensor unit of the first embodiment (see FIG. 1) further incorporates an acceleration sensor or the like for detecting joystick-like movements of the head. The user, while performing a plurality of types of switch operations by winking, for example, can perform input operations by the joystick-like motion of the head.

In the present embodiment, the function for detecting and accurately determining an asymmetric biological signal is combined with the pointing signal generated by the sensor (capable of measuring tilts using two- to three-axis gravitational acceleration sensors) detecting joystick-like movements of the head, whereby it is possible to provide functions similar to those of a personal computer mouse (combination of cursor movements and click operations). As illustrated in FIGS. 5A, 5B and FIG. 6, the movement of tilting the head forward is similar to the user positioning (pointing) operation of pushing a joystick forward or moving a mouse forward. Accordingly, the user can perform a cursor movement on the personal computer screen using a mouse or a joystick, and can further perform the operation of pressing a specific button (such as for a left click).

The tilting of the head left and right is intuitively associated with cursor movements in left and right directions. When the screen is facing relatively up and the user is looking down at the screen, the movement of tilting the head forward intuitively corresponds to the operation of moving the cursor forward (or upward on the screen). However, when the screen is placed vertically and the user is looking ahead, the movement of tilting the head backward may better intuitively correspond to moving the cursor upward on the screen. Accordingly, it may be desirable to convert, as appropriate, the meaning (positive or negative) of the signal of the forward/backward tilting of the head in accordance with the relationship with the screen angle.

Regardless of the screen angle, it is also possible to move the cursor in left and right directions not by the left/right tilting of the head, but by swinging the head left and right by the neck. For detecting such neck swings, a geomagnetic sensor or a gyro sensor may be utilized. In combination with the forward/backward tilting of the head, a laser pointer operating in conjunction with a personal computer may be placed on the head to achieve positioning on the screen, whereby the effect of the technique for detecting winks and the like can be enhanced.

The examples in the foregoing embodiments and the like have been provided to aid the understanding of the invention, and should not be construed as limiting the invention.

INDUSTRIAL APPLICABILITY

The input devices, input methods, and programs therefor of the present invention provide techniques allowing an operator who has difficulty using his or her hands or legs or an able-bodied person to perform operations without using hands or feet, and are therefore industrially useful.

The invention claimed is:

1. An input device comprising:
a first contact electrode configured to be placed at a first position around a right eye, the first contact electrode being a positive electrode or a negative electrode;
a second contact electrode configured to be placed at a second position around a left eye, the second contact electrode having a different polarity from the first contact electrode;
a detector configured to measure a potential difference between the first contact electrode and the second contact electrode, the detector further configured to detect a low-frequency component inclusive of the potential difference, the low-frequency component having a range of 1 Hz to 30 Hz; and
a discrimination processor configured to determine, based on the potential difference of the low-frequency component as detected by the detector, presence or absence of a right wink, and presence or absence of a left wink, via a single-channel recording using only the first contact electrode and the second contact electrode.

2. The input device according to claim 1, further comprising a transmitter configured to transmit a signal from the discrimination processor as an input operation signal.

3. The input device according to claim 2, further comprising a sensor integral with the detector, the sensor configured to detect movements including up-down and left-right motions of a head.

4. The input device according to claim 1, further comprising a sensor integral with the detector, the sensor configured to detect movements including up-down and left-right motions of a head.

5. An input method comprising:
measuring a potential difference between a first contact electrode placed at a first position around a right eye and a second contact electrode placed at a second position around a left eye, the first contact electrode being a positive electrode or a negative electrode, the second contact electrode having a different polarity from the first contact electrode;
detecting a low-frequency component inclusive of the potential difference, the low-frequency component having a range of 1 Hz to 30 Hz; and
determining, based on the potential difference of the low-frequency component as detected, presence or absence of a right wink, and presence or absence of a left wink, via a single-channel recording using only the first contact electrode and the second contact electrode.

6. The input method according to claim 5, further comprising transmitting a signal obtained from the determining as an input operation signal.

7. The input method according to claim 6, further comprising detecting a head movement combining a motion of tilting a head left and right or swinging a neck left and right along a first axis, with a motion of tilting the head forward and backward along a second axis, wherein the input operation signal based on the detecting of the head movement is transmitted.

8. The input method according to claim 5, further comprising detecting a head movement combining a motion of tilting a head left and right or swinging a neck left and right along a first axis, with a motion of tilting the head forward and backward along a second axis, wherein an input operation signal based on the detecting of the head movement is transmitted.

9. The input method according to claim 5, wherein the right wink and the left wink are left-right asymmetric movements of a left-right symmetric body part.

10. An input system comprising:
a detector including a first contact electrode configured to be placed around a right eye and a second contact electrode configured to be placed around a left eye, the first contact electrode being a positive electrode or a negative electrode, the second contact electrode having a different polarity from the first contact electrode, the detector configured to measure a potential difference between the first contact electrode and the second contact electrode and configured to detect a low-frequency component inclusive of the potential difference, the low-frequency component having a range of 1 Hz to 30 Hz; and
a discrimination processor configured to determine, based on the potential difference of the low-frequency component as detected by the detector, presence or absence of a right wink, and presence or absence of a left wink, via a single-channel recording using only the first contact electrode and the second contact electrode.

11. The input system according to claim 10, further comprising a transmitter configured to transmit a signal obtained by the discrimination processor as an input operation signal.

12. The input system according to claim 10, further comprising a sensor integral with the detector, the sensor configured to detect movements including up-down and left-right motions of a head.

* * * * *